US012111678B2

(12) United States Patent
Wang

(10) Patent No.: US 12,111,678 B2
(45) Date of Patent: Oct. 8, 2024

(54) ONE-HANDED JOYSTICK FOR EXCAVATORS

(71) Applicants: ZOOMLION Heavy Industry NA, Inc., Yorkville, WI (US); ZOOMLION Heavy Industry Science and Technology Co. Ltd., Changsha (CN)

(72) Inventor: Shu Wang, Yorkville, WI (US)

(73) Assignees: ZOOMLION HEAVY INDUSTRY NA, INC., Yorkville, WI (US); ZOOMLION HEAVY INDUSTRY SCIENCE AND TECHNOLOGY CO., LTD

( * ) Notice: Subject to any disclaimer, the term of this patent is extended or adjusted under 35 U.S.C. 154(b) by 98 days.

(21) Appl. No.: 18/118,784

(22) Filed: Mar. 8, 2023

(65) Prior Publication Data

US 2023/0221752 A1 Jul. 13, 2023

Related U.S. Application Data

(63) Continuation of application No. 17/704,405, filed on Mar. 25, 2022, now abandoned, which is a continuation-in-part of application No. 17/404,262, filed on Aug. 17, 2021, now Pat. No. 11,449,089.

(51) Int. Cl.

| | |
|---|---|
| ***G05G 9/04*** | (2006.01) |
| ***E02F 9/20*** | (2006.01) |
| ***G05G 9/047*** | (2006.01) |

(52) U.S. Cl.

CPC ........... *G05G 9/047* (2013.01); *E02F 9/2004* (2013.01); *G05G 2009/04748* (2013.01); *G05G 2009/04774* (2013.01); *G05G 2009/04781* (2013.01)

(58) Field of Classification Search

CPC ............... G05G 9/047; G05G 9/04737; G05G 2009/0474; G05G 2009/04748; G05G 2009/04774; G05G 2009/04781; E02F 3/65; E02F 9/2004; E02F 9/2012; H01H 25/04; H01H 2025/043; H01H 2025/045; B60K 2026/029

See application file for complete search history.

(56) References Cited

U.S. PATENT DOCUMENTS

| | | | | |
|---|---|---|---|---|
| 11,573,592 | B1 * | 2/2023 | Wang | G05G 9/047 |
| 11,886,218 | B2 * | 1/2024 | Wang | B66C 13/56 |

* cited by examiner

*Primary Examiner* — Adam D Rogers
(74) *Attorney, Agent, or Firm* — Donald J. Ersler

(57) ABSTRACT

A one-handed joystick for excavators allows an operator to make all necessary motions with a single hand and arm for manipulating an excavator tool. The one-handed joystick includes a rotatable cylinder bar, a rotatable ring and an industrial joystick base. The rotatable cylinder bar is grasped with a hand. The industrial base is moved front to back, or right to left. The following are preferable hand/arm motions. A downward hand curl is associated with a bucket digging motion; an upward hand curl is associated with a bucket dump; a forearm forward push is associated with a boom/stick extension; a forearm reward pull is associated with a boom/stick retraction; a left-hand movement is associated with swinging the excavator left; a right-hand movement is associated with swinging the excavator right; a clockwise hand twist is associated with a stick/boom extension; and a counter clockwise hand twist is associated with a stick/boom retraction.

20 Claims, 12 Drawing Sheets

SAE PATTERN

ISO PATTERN

| | Excavator Motion | |
|---|---|---|
| Hand Motion | SAE Example | ISO Example |
| Wrist Curl In (Flexion) | Bucket Curl | |
| Wrist Curl Out (Extension) | Bucket Dump | |
| Forearm Push Forward | Stick Extension | Boom Extension (Raise) |
| Forearm Pull Rearward | Stick Retraction | Boom Retraction (Lower) |
| Hand Move Left | Swing Left | |
| Hand Move Right | Swing Right | |
| Hand Twist CW | Boom Extension (Raise) | Stick Extension |
| Hand Twist CCW | Boom Retraction (Lower) | Stick Retraction |

FIG. 10

ONE-HANDED JOYSTICK FOR EXCAVATORS

CROSS-REFERENCES TO RELATED APPLICATIONS

This is a continuation patent application, which takes priority from patent application Ser. No. 17/704,405 filed on Mar. 25, 2022, which takes priority from patent application Ser. No. 17/404,262, filed on Aug. 17, 2021.

BACKGROUND OF THE INVENTION

Field of the Invention

The present invention relates generally to heavy equipment and more specifically to a one-handed joystick for excavators, which makes motions of the joystick more closely resemble the motions of an excavator for operators with limited or no experience.

Discussion of the Prior Art

Existing SAE joystick motion patterns and ISO joystick motion patterns for controlling an excavator require a steep learning curve for new operators. The existing motions are not are not very intuitive for two hand operation. Many of the joystick motions do not mimic the motion of an excavator. The most-used existing control patterns for excavators are described in FIGS. 8 & 9. Further, the existing SAE joystick patterns and ISO joystick patterns are based on utilizing two joysticks. A specially designed joystick would allow the operator to execute additional motion commands not possible with current joysticks. U.S. Pat. No. 5,223,776 to Radke et al. discloses a six-degree virtual pivot controller. U.S. Pat. No. 7,113,836 to Hornig discloses a control device for maneuvering an apparatus. Patent document no. WO 2007/144629 to Clough et al. discloses a control system for earth moving and working apparatus.

Accordingly, there is clearly felt need in the art for a one-handed joystick for excavators, which makes motions of the joystick more closely resemble the motions of an excavator for an operator with limited or no experience and also allows the operator to execute additional motion commands in SAE or ISO motion patterns.

SUMMARY OF THE INVENTION

The present invention provides a one-handed joystick for excavators, which makes motions of the joystick more closely resemble the motions of an excavator for an operator with limited or no experience. The one-handed joystick for excavators (improved joystick) preferably includes a state-of-the art joystick base for heavy equipment (industrial joystick base), which includes two axis functionality and a rotary upper handle. The rotary upper handle preferably includes an outer base ring, a rotatable ring, a position sensor and a base portion. The base portion extends downward from a bottom of the outer base ring. A bottom of the base portion is engaged with a top of the industrial joystick base. The rotatable ring is rotatably retained in an inner perimeter of the outer base ring. The outer base ring preferably includes opposing grooves for preventing axially movement of the rotatable ring. One of the opposing grooves is preferably retained in detachable ring. The detachable ring is secured to one side of the outer base ring with any suitable attachment method, such as fasteners, a bonding agent, a snap arrangement or any other suitable attachment method.

A sensor cavity is formed in an inner perimeter of the outer base ring, below the grooves for receiving the rotatable ring. The position sensor is preferably a PCAP (projective capacitive) touch sensor. However, other types of sensors may also be used. The rotatable ring preferably includes a ring portion and a rotatable cylinder bar. The ring portion preferably includes two halves. A pair of opposing bosses preferably extend inward from an inner perimeter of the ring portion. A through hole is formed through the pair of opposing bosses. The rotatable cylinder bar includes an inner diameter. The inner diameter of the rotatable cylinder bar is sized to rotatably receive an outer diameter of the pair of opposing bosses. A contact plug is preferably pressed into the inner diameter of the rotatable cylinder bar. However, the contact plug may be molded into the inner perimeter of the rotatable cylinder bar. The contact plug includes a biased center conductive contact and a biased peripheral conductive contact. The heights of the center and peripheral conductive contacts are equal. It is preferable to use a compression spring to bias the center and peripheral conductive contacts outward to contact the position sensor. The ring portion with the rotatable cylinder bar retained therein is inserted into the inner perimeter of the outer base ring. The detachable ring is secured to one side of the outer base ring. The center and peripheral conductive contacts must make physical contact with the position sensor.

The wiring from the position sensor may be run down a side of the outer base ring or molded into rotary upper handle. The wiring is connected to a suitable ring controller for determining the location of the rotatable cylinder bar and the rotatable ring. The position sensor includes a grid arrangement, which allows a rotational position and an angular position of the two-spring loaded conductive contacts to be determined. When the rotatable cylinder bar is rotated in either a clockwise or counterclockwise direction, the center conductive contact will remain relatively stationary, while the peripheral conductive contact will rotate about the center conductive contact. The rotational motion of the rotatable cylinder bar will be picked-up by the ring controller and could be used to control curling or dumping of a bucket. When the rotatable ring is rotated in either a clockwise or counterclockwise direction the angular motion will be picked-up by the ring controller and could be used to control boom-up or boom-down.

The improved joystick allows an operator to make all the necessary motions with a single hand and arm for manipulating an excavator tool. The improved joystick includes the rotatable cylinder bar, the rotatable ring and the industrial joystick base. To start the operation, a hand grasps the rotatable cylinder bar. The rotatable cylinder bar may be rotated in opposite directions. The rotatable ring may be rotated in a clockwise or counterclockwise motion. The industrial base may be moved in a front to back or left to right. Associating a downward hand curl is analogous to a bucket digging motion. An upward hand curl is analogous to a bucket dump. A forearm forward push is analogous to a boom/stick extension. A forearm reward pull is analogous to a boom/stick retraction. A hand movement to the left is analogous to swinging the excavator left. A hand movement to the right is analogous to swinging the excavator right. A clockwise hand twist is analogous to a stick/boom extension. A counter clockwise hand twist is analogous to a stick/boom retraction.

Accordingly, it is an object of the present invention to provide a joystick having increased control functionality having a unique moving structure, which allows more functions to be performed by one hand.

It is another object of the present invention to provide a one-handed joystick for excavators, which makes motions of the joystick more closely resemble the motions of an excavator for an operator with limited or no experience.

Finally, it is another object of the present invention to provide a one-handed joystick for excavators, which allows the operator execute additional motion commands as SAE or ISO patterns.

These and additional objects, advantages, features and benefits of the present invention will become apparent from the following specification.

BRIEF DESCRIPTION OF THE DRAWINGS

FIG. 10 is a table of hand and forearm motions associated with movements of an excavator of an improved joystick in accordance with the present invention.

DETAILED DESCRIPTION OF THE PREFERRED EMBODIMENTS

Figure 1:
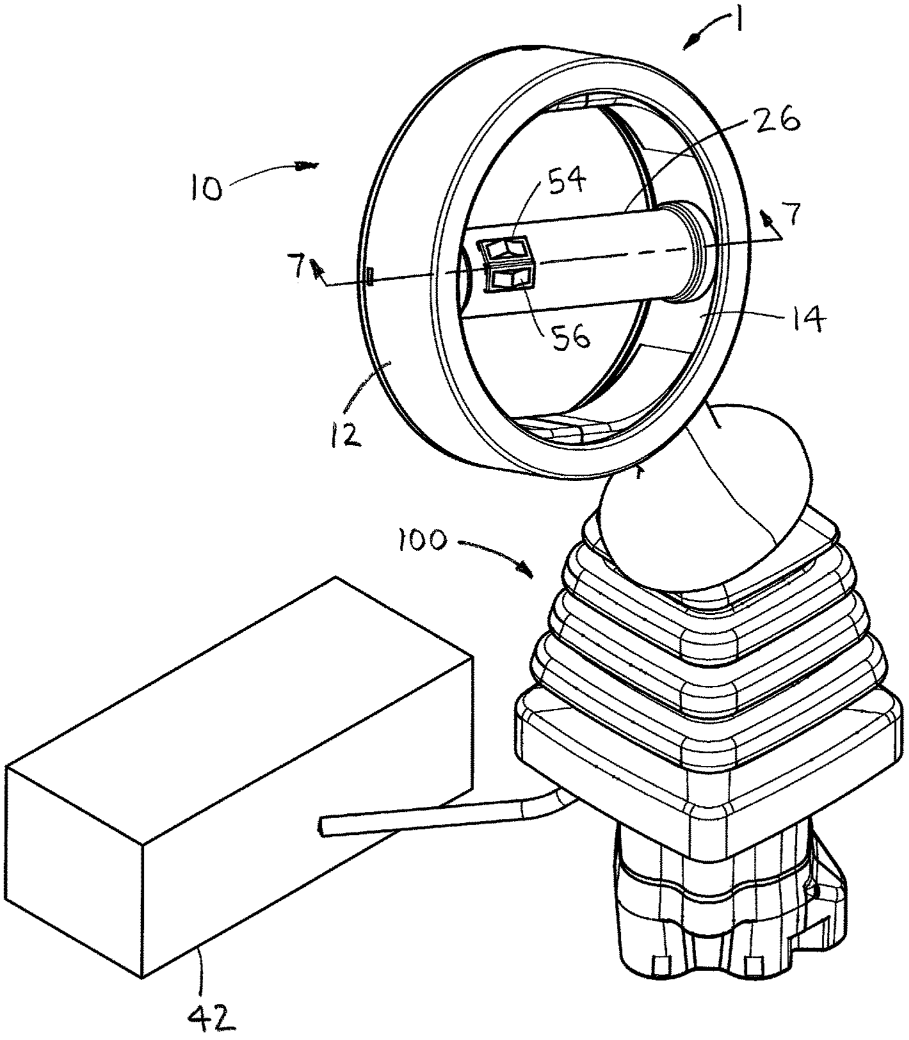
FIG. 1 is a perspective view of an improved joystick in accordance with the present invention.
Figure 2:
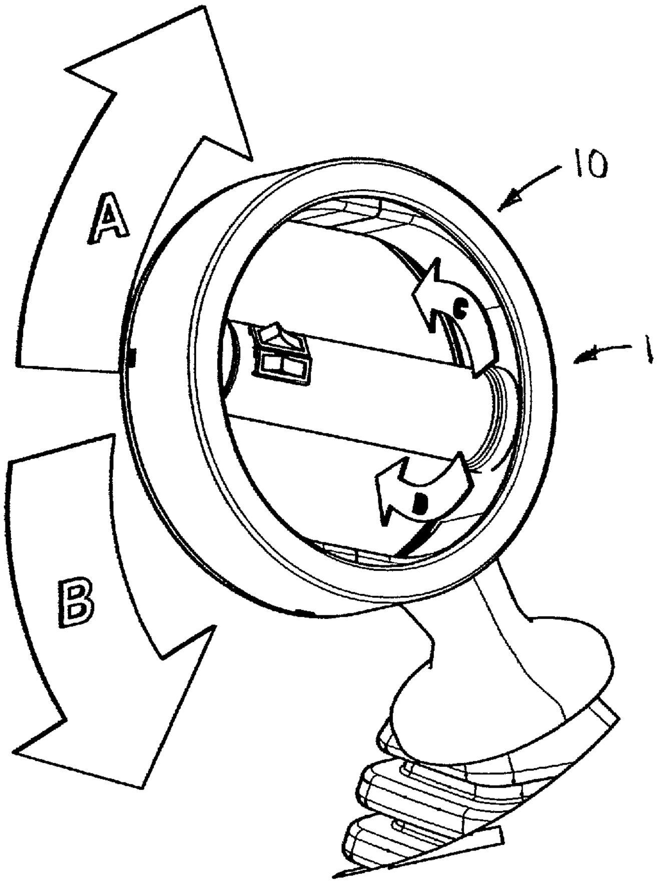
FIG. 2 is a perspective view of an improved joystick illustrating rotation of a ring portion and a rotatable cylinder bar in accordance with the present invention.
Figure 3:
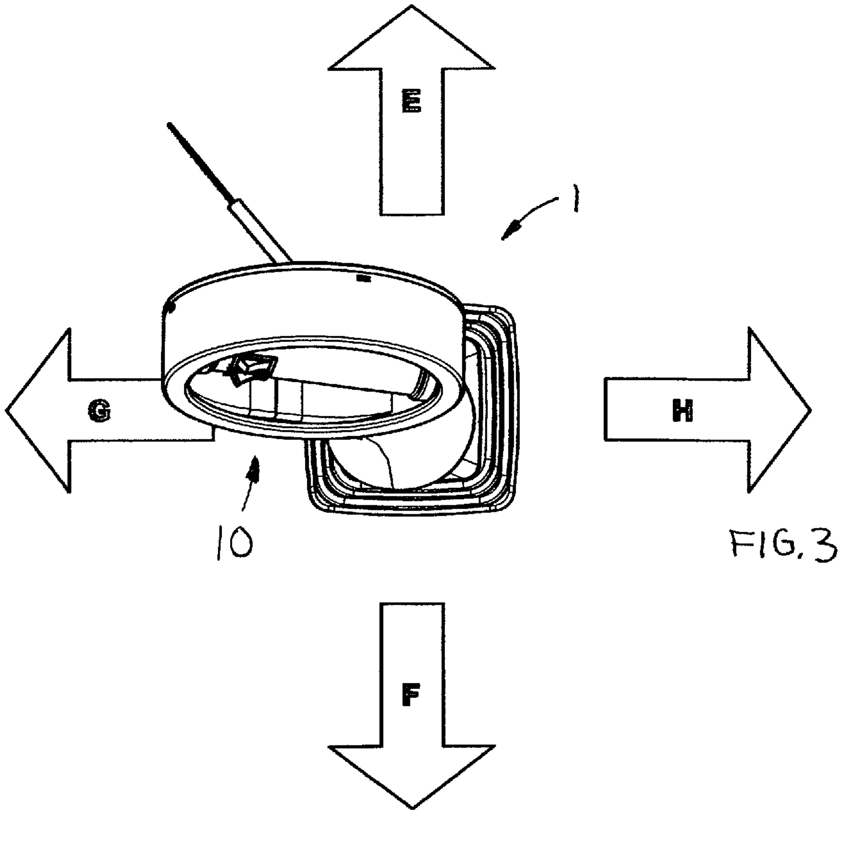
FIG. 3 is a perspective view of an improved joystick illustrating x-axis motion and y-axis motion of a rotary upper handle in accordance with the present invention.
Figure 4:
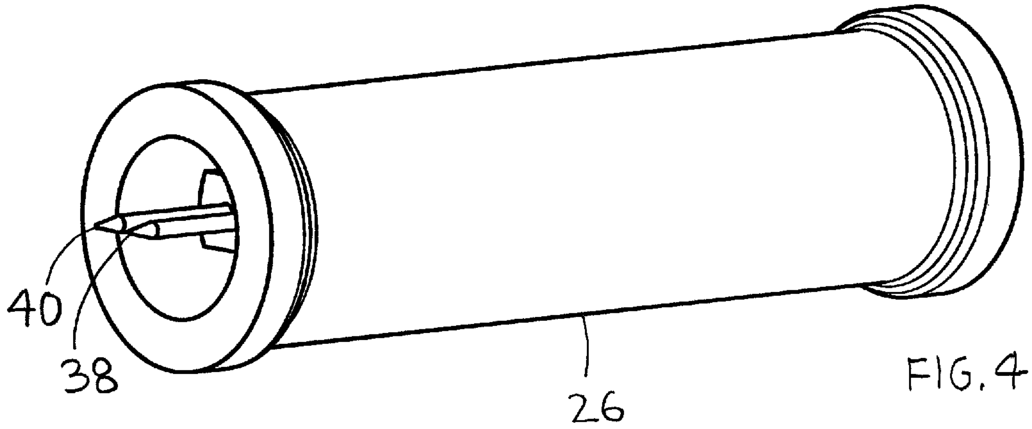
FIG. 4 is a perspective view of a rotatable cylinder bar of an improved joystick in accordance with the present invention.
Figure 5:
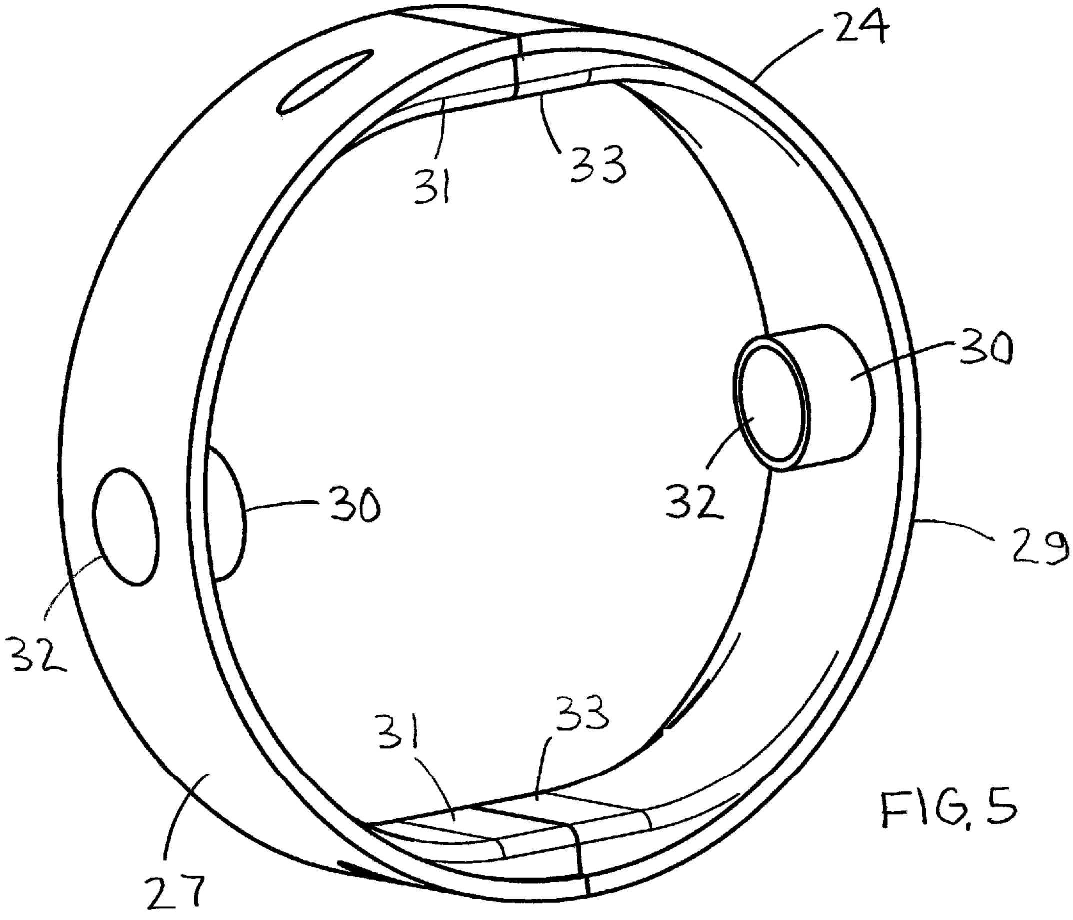
FIG. 5 is a perspective view of a ring portion of an improved joystick in accordance with the present invention.
Figure 6:
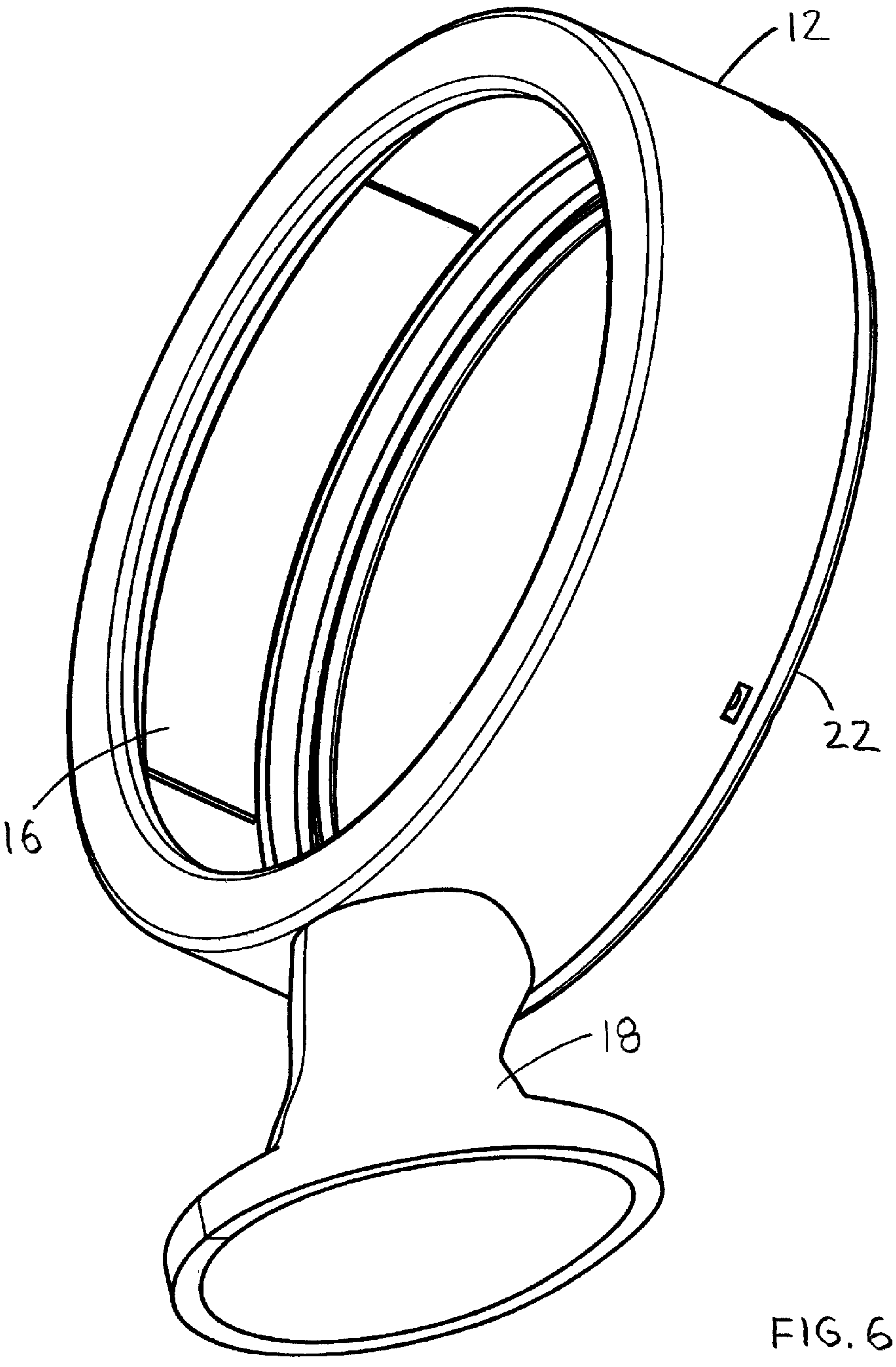
FIG. 6 is a perspective view of an outer base ring of an improved joystick in accordance with the present invention.
Figure 7:
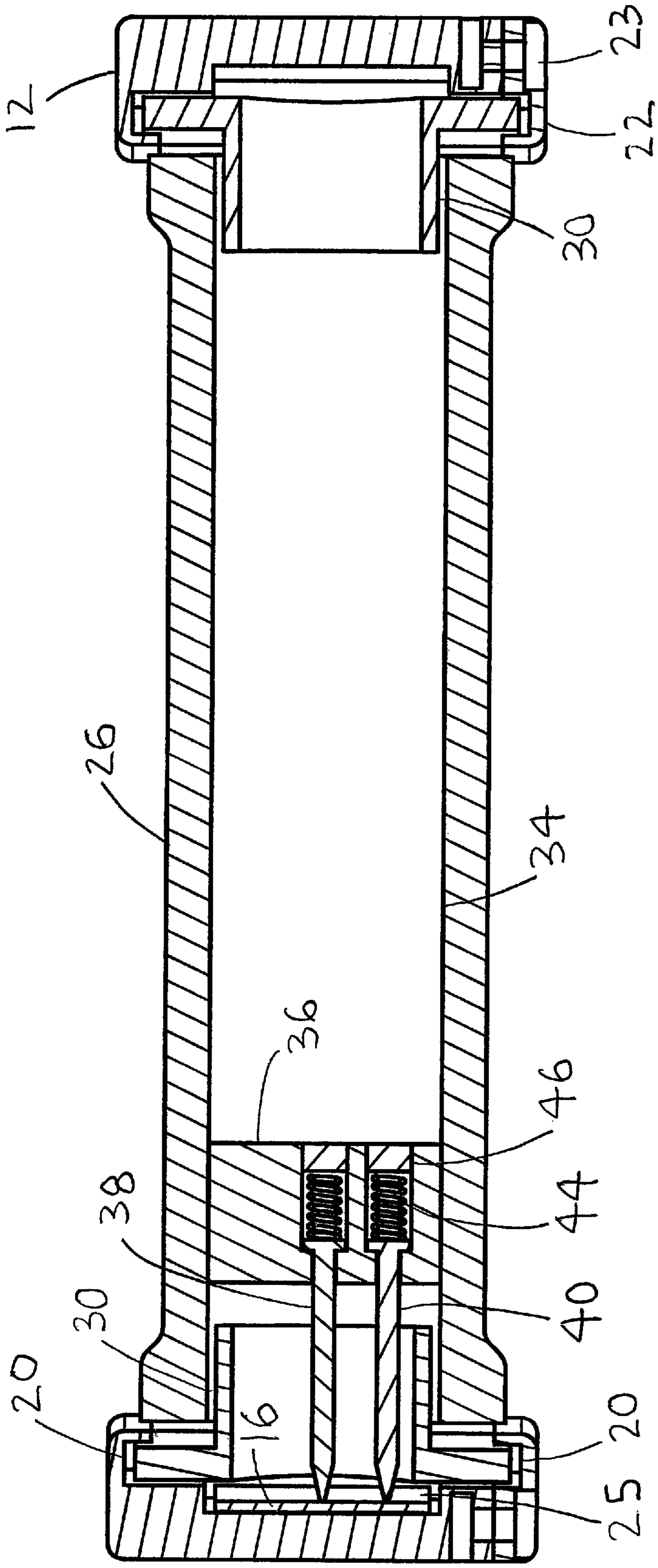
FIG. 7 is a cross-sectional view of a rotary upper handle of an improved joystick in accordance with the present invention.

With reference now to the drawings, and particularly to FIG. 1, there is shown a perspective view of an improved joystick 1. With reference to FIGS. 2-3, the improved joystick 1 preferably includes a state-of-the art joystick base for heavy equipment (industrial joystick base) 100 with x-axis and y-axis movement, and a rotary upper handle 10. There are numerous ways in the art of implementing a two-axis joystick. Therefore, a further explanation of the operation of a two-axis joystick is not necessary.

With reference to FIGS. 4-7, the rotary upper handle 10 preferably includes an outer base ring 12, a rotatable ring 14, a position sensor 16 and a base portion 18. A bottom of the base portion 18 extends from a top of the industrial joystick base 100. The outer base ring 12 extends upward from a top of the base portion 18. The rotatable ring 14 is rotatably retained in an inner perimeter of the outer base ring 12. The outer base ring 12 preferably includes a pair of opposing grooves 20 for preventing axial movement of the rotatable ring 14. One of the opposing grooves 20 is preferably retained in a detachable ring 22. The detachable ring 22 is secured to one side of the outer base ring with any suitable attachment device, such as a plurality of fasteners 23, a bonding agent, snap arrangement or any other suitable attachment method.

A sensor cavity 25 is formed in an inner perimeter of the outer base ring 12 and below a bottom of the pair of opposing grooves 20 for receiving the position sensor 16. The position sensor 16 is preferably a PCAP (projective capacitive) touch sensor. However, other types of sensors may also be used. The position sensor 16 must be curved along a lengthwise axis or be flexible to conform to an inner perimeter of the sensor cavity 25. The rotatable ring 14 preferably includes a ring portion 24 and a rotatable cylinder bar 26. A pair of opposing bosses 30 preferably extend inward from an inner perimeter of the ring portion 24. A through hole 32 is formed through the pair of opposing bosses 30.

The ring portion 24 preferably includes first and second halves 27, 29. Each end of the first half 27 includes an attachment area 31 for attaching an opposing half. Each end of the second half 29 includes an attachment area 33 for attaching an opposing half. The first and second halves 27, 29 may be attached to each other with fasteners, adhesive, snaps or any other suitable attachment method. A pair of opposing bosses 30 preferably extend inward from an inner perimeter of the ring portion 24. A through hole 32 is formed through the pair of opposing bosses 30. The rotatable cylinder bar 26 includes an inner diameter 34. The inner diameter 34 of the rotatable cylinder bar 26 is sized to rotatably receive an outer diameter of the pair of opposing bosses 30. A contact plug 36 is preferably pressed into the inner diameter 34 of the rotatable cylinder bar 26. However, the contact plug 36 may be molded into the inner perimeter of the rotatable cylinder bar 26. The contact plug 36 preferably includes a biased center conductive contact 38 and a biased peripheral conductive contact 40. However, the contact plug 36 may only include a center conductive contact 38, if an electrical output from the rotatable cylinder bar 26 is not needed. A compression spring 44 and set screw 46 are preferably used to bias the center and peripheral conductive contacts against the position sensor 16. The heights of the center and peripheral conductive contacts 38, 40 are equal.

The ring portion 24 with the rotatable cylinder bar 26 retained therein is inserted into the inner perimeter of the outer base ring 12. The detachable ring 22 is secured to one side of the outer base ring 12 with the plurality of fasteners 23. Sensor wiring (not shown) from the position sensor 16 is run down a side of the outer base ring 12 or molded into the rotary upper handle 10. However, the ring portion 24 may not rotate relative to the outer base ring 12 for some applications. The rotatable cylinder bar 26 would rotate with the center and peripheral conductive contacts 38, 40. The sensor wiring is connected to a suitable ring controller 42 for determining the location of the rotatable cylinder bar 26 and the ring portion 24. The position sensor 16 includes a grid arrangement, which allows a rotational position and an angular position of the ring portion 24 and the rotatable cylinder bar 26 to be determined. When the rotatable cylinder bar 26 is rotated in either a clockwise or counterclockwise direction, the center conductive contact 38 will remain relatively stationary, while the peripheral conductive contact 40 will rotate about the center conductive contact 38. The rotational motion of the rotatable cylinder bar 26 will be picked-up by the ring controller 42 and could be used to control curling or dumping of a bucket. When the rotatable ring 14 is rotated in either a clockwise or counterclockwise direction the angular motion will be processed by the ring controller 42 and could be used to control boom-up or boom-down. Movement of the rotary upper handle 10 in the X-axis and the Y-axis will also be processed by the ring controller 42 and used to operate the appropriate attachment. Buttons, toggle switches, thumb wheels and other control devices may also be added to the rotary upper handle 10.

Figure 8:
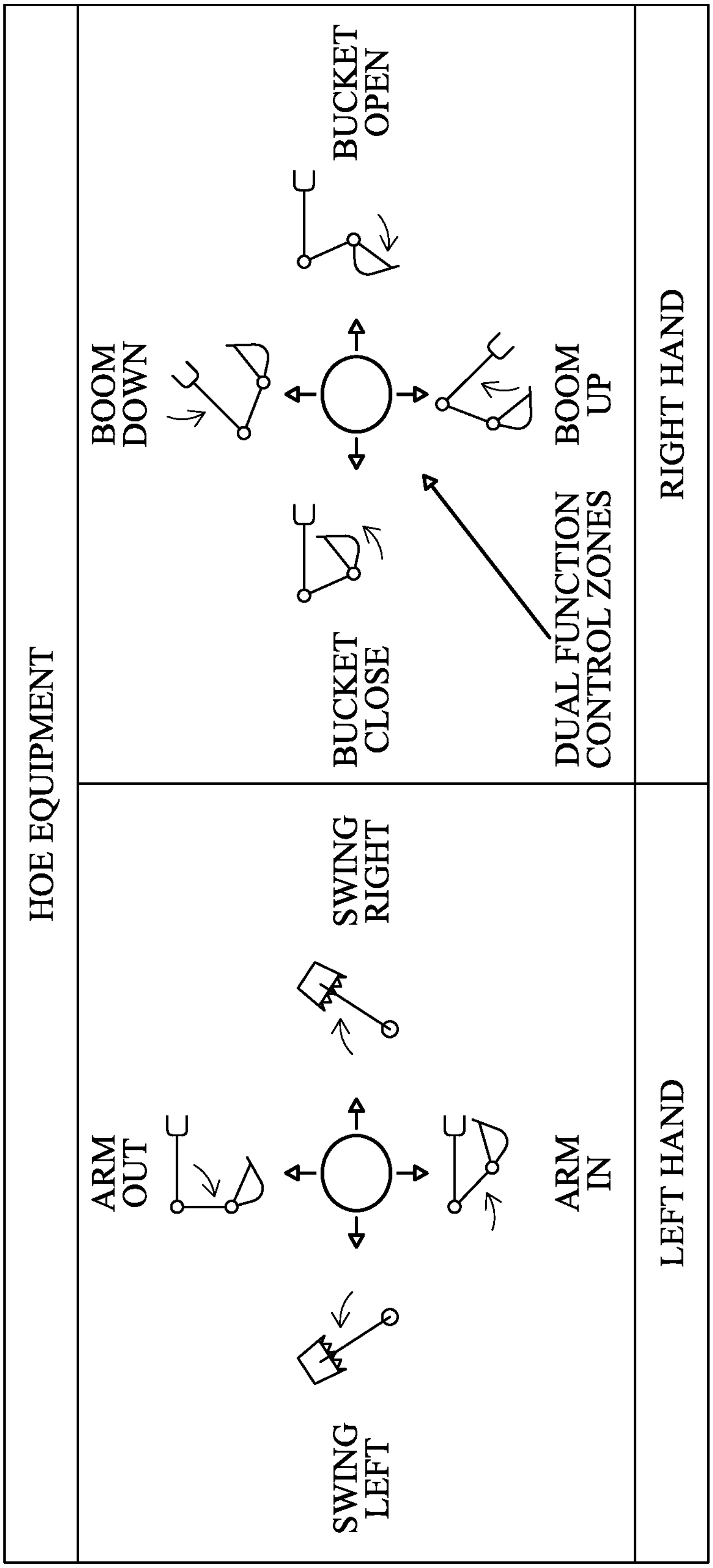
FIG. 8 (PRIOR ART)
FIG. 8 is a schematic diagram of left and right SAE joystick motion patterns.
Figure 9:
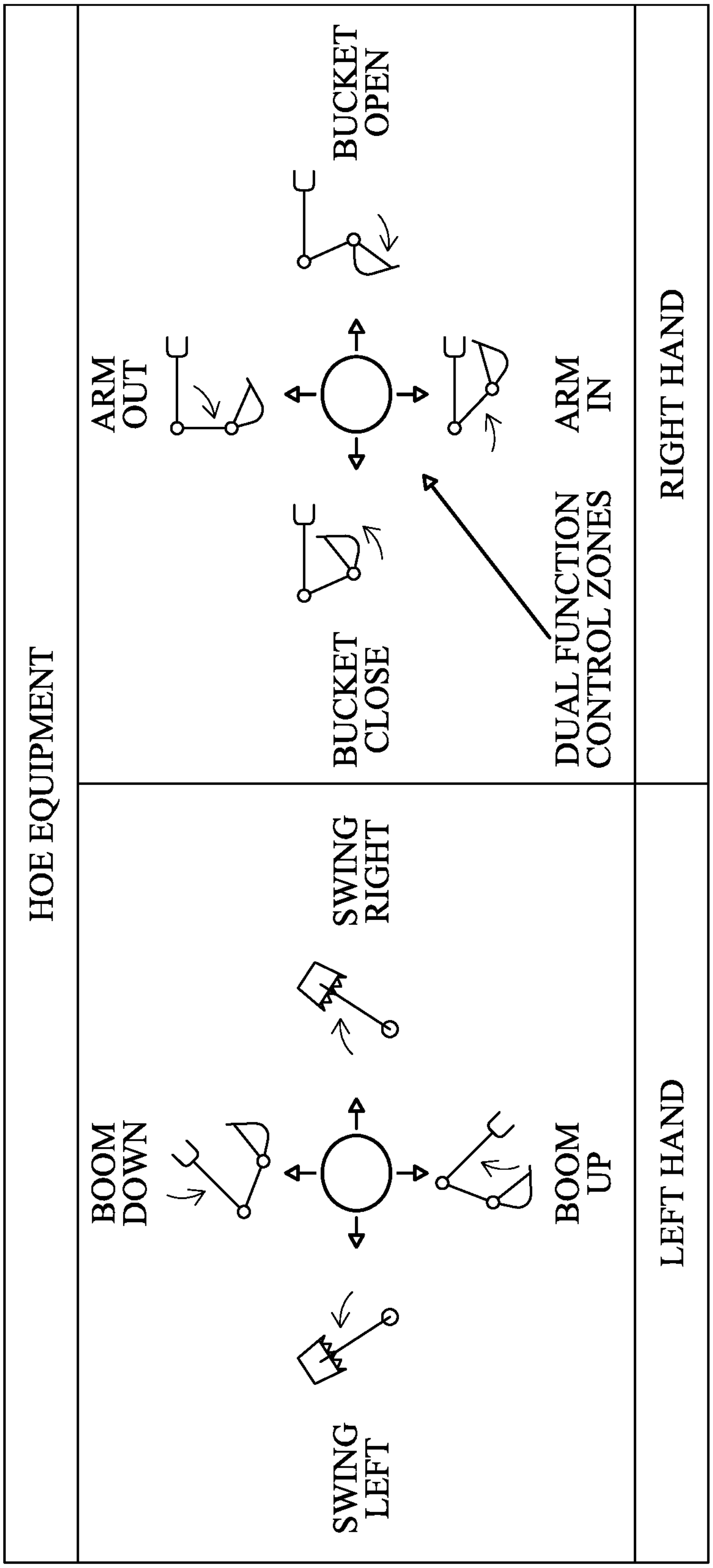
FIG. 9 (PRIOR ART)
FIG. 9 is a schematic diagram of left and right ISO joystick motion patterns.
Figure 11:
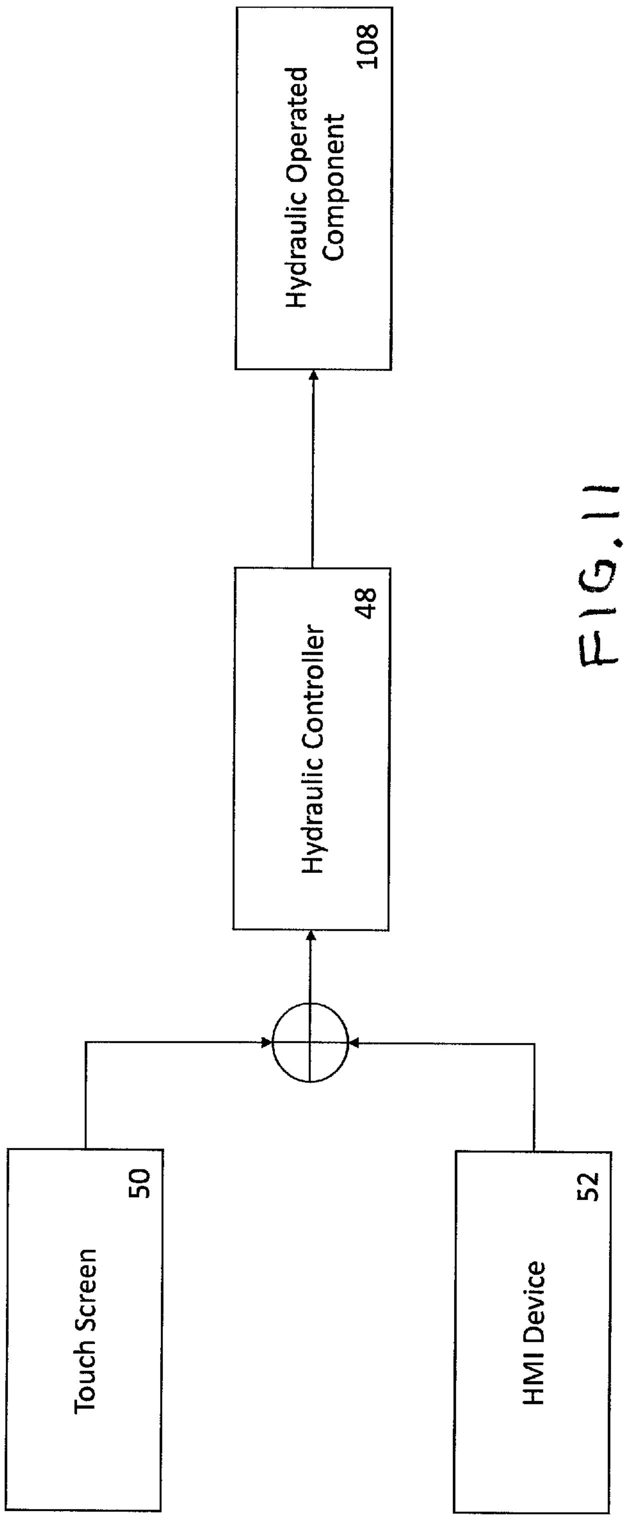
FIG. 11 is a schematic diagram illustrating how to reprogram a hydraulic controller to change the association of motions of an improved joystick with an excavator in accordance with the present invention.

FIG. 8 illustrates how left and right SAE joystick motion patterns control the motion of excavator elements. FIG. 9 illustrates how left and right ISO joystick motion patterns control the motion of excavator elements. FIG. 10 provides a list of preferred motions of the improved joystick 1 associated with motions of an excavator. However, the listed motions of the improved joystick 1 could be associated with different motions of the excavator. With reference to FIG. 11, the new association of motions could be made by reprogramming a hydraulic controller 48 through an input device, such as a cab touch screen 50 or a human-machine interface (HMI) device 52. The hydraulic controller 48 operates a hydraulic operated component, such as an excavator tool 108.

Figure 12:
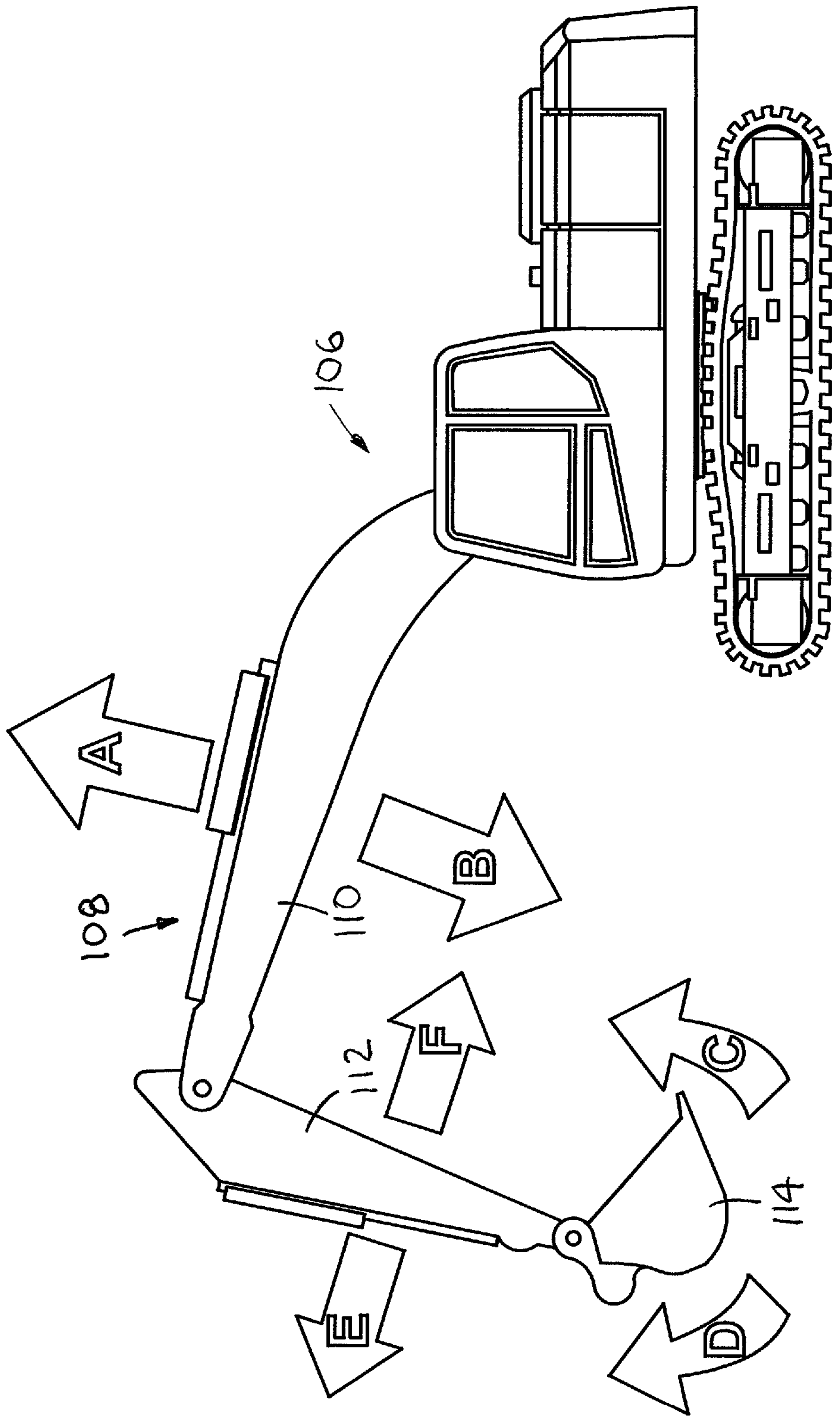
FIG. 12 is a side view of an excavator with labeled arrows that correspond to movements of an improved joystick in FIGS. 2-3 and a table in FIG. 10 to provide a pattern similar to SAE in accordance with the present invention.
Figure 14:
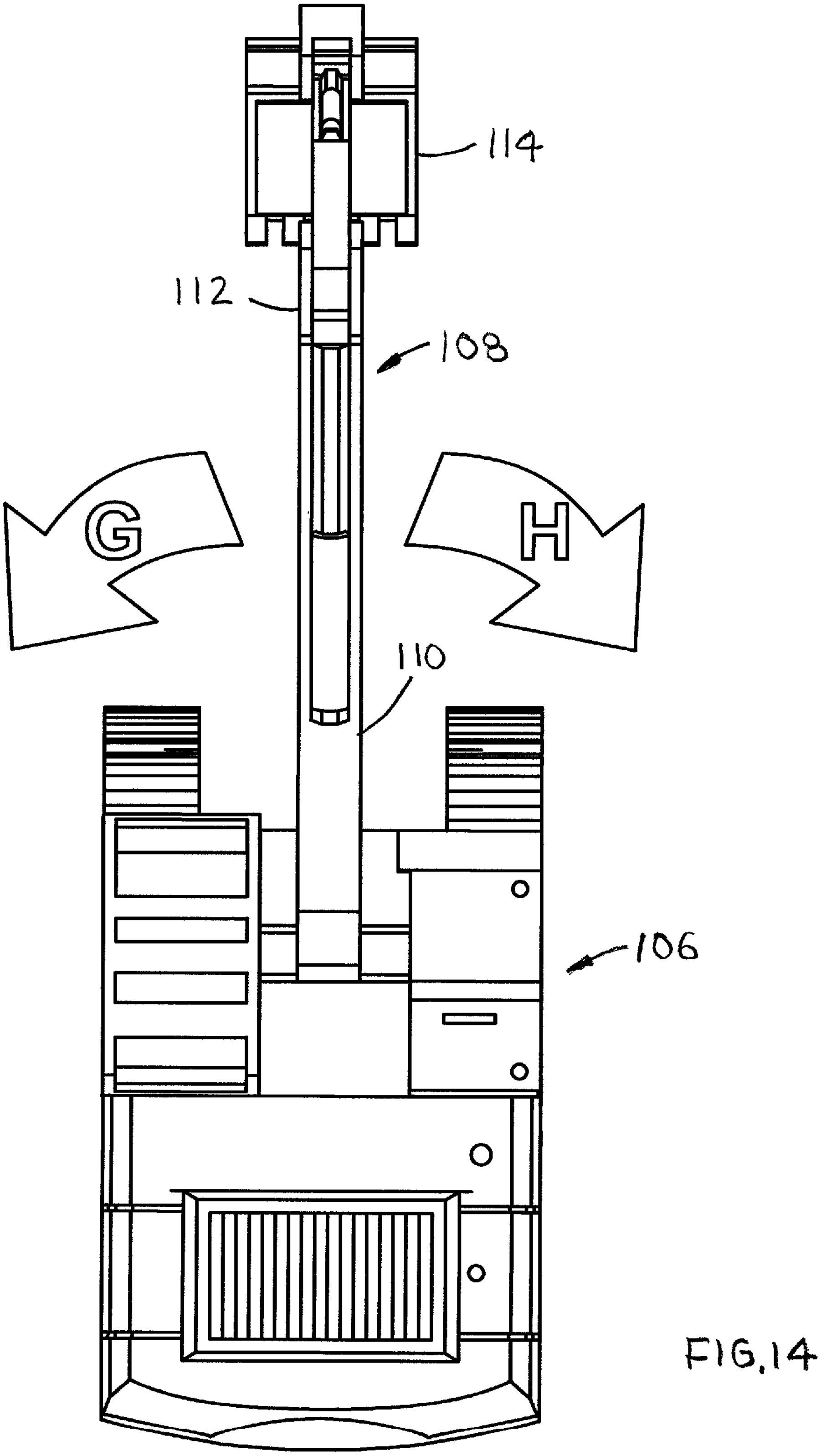
FIG. 14 is a top view of an excavator with labeled arrows that correspond to movements of an improved joystick in FIGS. 2-3 and a table in FIG. 10 in accordance with the present invention.

With reference to FIG. 12 in SAE mode, it is preferable to associate a downward hand curl "C" to a bucket 114 digging motion; and an upward hand curl "D" with a bucket 114 dump. It is preferable to associate a forearm forward push "E" to a stick 112 extension; and a forearm reward pull "F" to a stick retraction 112. With reference to FIG. 14, it is preferable to associate a hand movement to the left "G" to swinging the excavator 106 left; and a hand movement to the right "H" to swinging the excavator 106 right. It is preferable to associate a clockwise hand twist "A" to a boom 110 extension; and a counter clockwise hand twist "B" to a boom 110 retraction.

Figure 13:
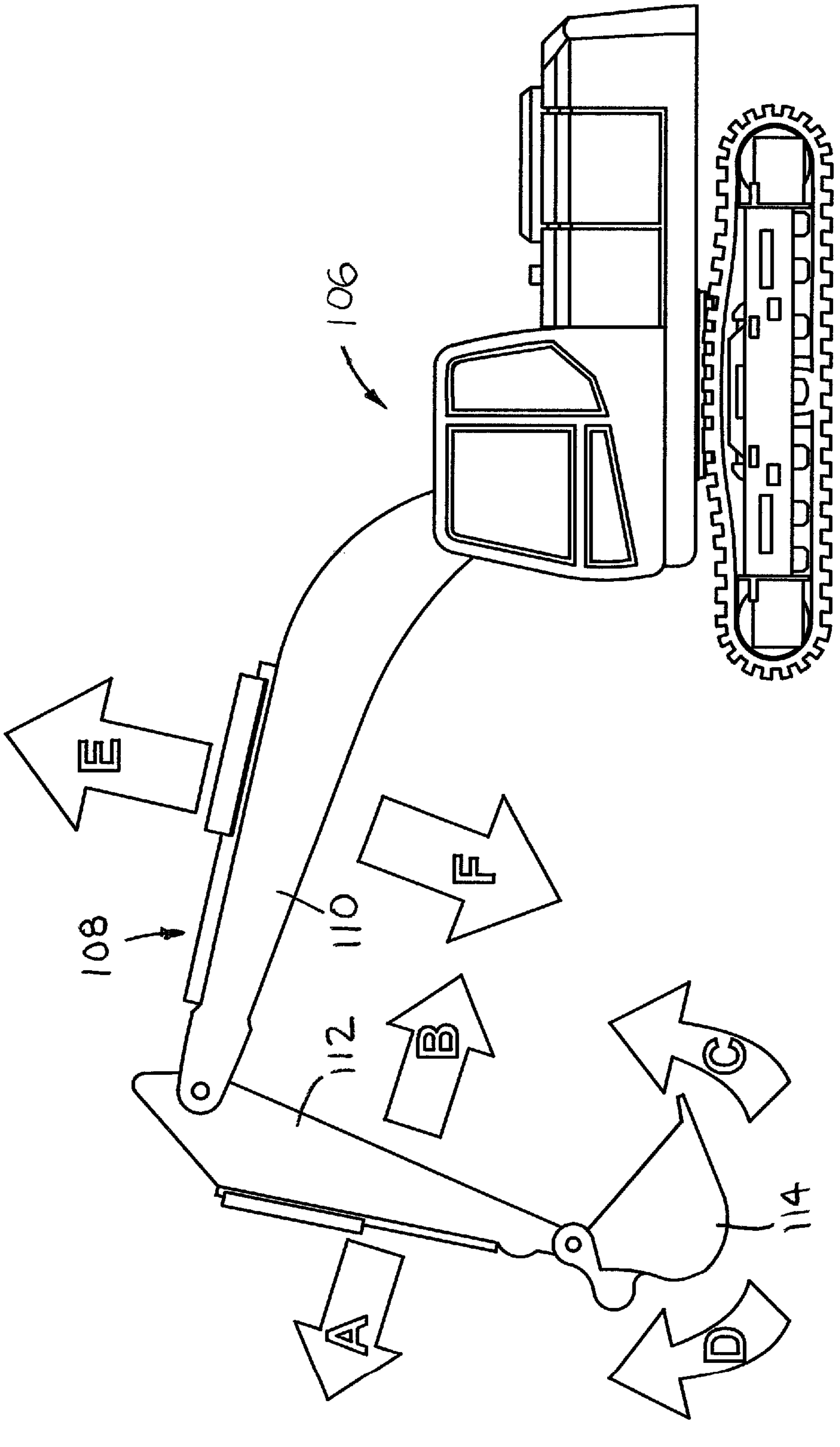
FIG. 13 is a side view of an excavator with labeled arrows that correspond to movements of an improved joystick in FIGS. 2-3 and a table in FIG. 10 to provide a pattern similar to ISO in accordance with the present invention.

With reference to FIG. 13 in ISO mode, it is preferable to associate a downward hand curl "C" to a bucket 114 digging motion; and an upward hand curl "D" with a bucket 114 dump. It is preferable to associate a forearm forward push "E" to a boom 110 extension; and a forearm reward pull "F" to a boom 110 retraction. With reference to FIG. 14, it is preferable to associate a hand movement to the left "G" to swinging the excavator 106 left; and a hand movement to the right "H" to swinging the excavator 106 right. It is preferable to associate a clockwise hand twist "A" to a stick 112 extension; and a counter clockwise hand twist "B" to a stick 112 retraction. However, the aforementioned hand and arm motions could be associated with other movements of the boom, stick and bucket through electrical switches and circuits in a harness to activate and deactivate different solenoids to perform the related functions.

A SAE/ISO pattern switch 54 is preferably located on the rotatable cylinder bar 26 for changing the operation to SAE or ISO. The SAE/ISO pattern switch uses electrical switches and circuits in a harness to activate and deactivate different solenoids to perform the related functions through an electrical hydraulic control system. An enable/disable switch 56 is used to deactivate electrical output from rotation of the rotatable ring 14, while allowing electrical output from the rotatable cylinder bar 26. The SAE/ISO pattern switch 54 and the enable/disable switch 56 may be implemented with any suitable push button switch. Entry of improved joystick 1 and excavator 106 motion associations in the hydraulic controller 48 through the cab touch screen 50 or HMI device 52 preferably over rides the SAE/ISO pattern switch 54 and the enable/disable switch 56.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method for operating a tool of an excavator, comprising the steps of:

providing a joystick base having a first electrical output for left to right movement and a second electrical output for forward to backward movement;

extending an outer base ring from a top of said joystick base; and providing a rotatable cylinder bar which is rotatably retained in said outer base ring, said rotatable cylinder bar is sized to be grasped, said rotatable cylinder bar includes a lengthwise axis, said rotatable cylinder bar rotates about said lengthwise axis, rotation of said rotatable cylinder bar in one direction causes the tool to have a first movement, rotation of said rotatable cylinder bar in an opposite direction causes the tool to have a second movement.

2. The method of operating a tool of an excavator of claim 1, further comprising the step of:

associating the left movement of said joystick base with swinging the excavator in a leftward direction.

3. The method of operating a tool of an excavator of claim 1, further comprising the step of:

associating the right movement of said joystick base with swinging the excavator in a rightward direction.

4. The method of operating a tool of an excavator of claim 1, further comprising the step of:

associating the forward movement of said joystick base with a boom extension or a stick extension.

5. The method of operating a tool of an excavator of claim 1, further comprising the step of:

associating the rear backward movement of said joystick base with a boom retraction or a stick retraction.

6. The method of operating a tool of an excavator of claim 1, further comprising the step of:

providing a SAE-ISO pattern switch in said rotatable cylinder bar for switching from a SAE pattern to an ISO pattern.

7. The method of operating a tool of an excavator of claim 1, further comprising the step of:

providing a hydraulic controller for receiving entry from an input device to change a motion association between the tool and said joystick.

8. The method of operating a tool of an excavator of claim 1, further comprising the step of:

defining the tool as a bucket, said rotation of said rotatable cylinder bar in the one direction is associated with a digging motion of the bucket; and rotating said rotatable cylinder bar in the opposite direction associated with dumping the bucket.

9. A method for operating a tool of an excavator, comprising the steps of:

providing a joystick base having a first electrical output for left to right movement and a second electrical output for forward to backward movement;

extending an outer base ring from a top of said joystick base;

retaining rotatably an inner base ring in an inner perimeter of said outer base ring, associating rotation of said inner base ring in one direction with a first movement of the tool, associating rotation of said inner base ring in an opposite direction with a second movement of the tool; and retaining rotatably a rotatable cylinder bar in said inner base ring, said rotatable cylinder bar is sized to be grasped, said rotatable cylinder bar includes a lengthwise axis, said rotatable cylinder bar rotates about said lengthwise axis, rotating said rotatable cylinder bar in one direction is associated with a third movement of the tool, rotating said rotatable cylinder bar in an opposite direction is associated with a fourth movement of the tool.

10. The method of operating a tool of an excavator of claim 9, further comprising the step of:

providing a hydraulic controller for receiving an entry from an input device to change a motion association between the tool and said joystick.

11. The joystick for operating a tool of an excavator of claim 10 wherein:

defining an axis of rotation of said inner base ring as being parallel with an axis of said outer base ring.

12. The method of operating a tool of an excavator of claim 9, further comprising the step of:

defining the tool as a bucket, said rotation of said rotatable cylinder bar in the one direction is associated with a digging motion of the bucket; and rotating said rotatable cylinder bar in the opposite direction associated with dumping the bucket.

13. The joystick for operating a tool of an excavator of claim 9 wherein:

locating said lengthwise axis of said rotational cylinder bar in a horizontal orientation during rotation.

14. A method for operating a first tool, a second tool and a third tool of an excavator, comprising the steps of:

providing a joystick base with an electrical output for left, right, forward and backward movement;

extending an outer base ring from a top of said joystick base, moving said joystick base to the left causes the first tool to have a first movement, moving said joystick base to the right causes the first tool to have a second movement, moving said joystick base forward causes the second tool to have a third movement, moving said joystick base backward causes the second tool to have a fourth movement;

retaining rotatably an inner base ring in an inner perimeter of said outer base ring; and retaining a cylinder bar in said inner base ring, said cylinder bar is sized to be grasped, rotating said inner base ring in one direction causes the third tool to have a fifth movement, rotating said inner base ring in an opposite direction causes the third tool to have a sixth movement.

15. The method of operating a first tool, a second tool and a third tool of an excavator of claim 14, further comprising the step of:

defining the first tool as an excavator base, associating the left movement of said joystick base with swinging the excavator base in a leftward direction.

16. The method of operating a first tool, a second tool and a third tool of an excavator of claim 14, further comprising the step of:

defining the first tool as an excavator base, associating the right movement of said joystick base with swinging the excavator base in a rightward direction.

17. The method of operating a first tool, a second tool and a third tool of an excavator of claim 14, further comprising the step of:

defining the second tool as a stick or a boom, associating the forward movement of said joystick base with a boom extension or a stick extension.

18. The method of operating a first tool, a second tool and a third tool of an excavator of claim 14, further comprising the step of:

defining the second tool as a stick or a boom, associating the backward movement of said joystick base with a boom retraction or a stick retraction.

19. The method of operating a first tool, a second tool and a third tool of an excavator of claim 14, further comprising the step of:

providing a hydraulic controller for receiving entry from an input device to change a motion association between the first, second or third tool and said joystick.

20. The method of operating a first tool, a second tool and a third tool of an excavator of claim 14, further comprising the step of:

defining the first tool as a boom or a stick, rotating said inner base ring in the one direction is associated with extending the stick or the boom; and rotating said inner base ring in the opposite direction is associated with retracting the stick or the boom.

* * * * *